United States Patent
Paterno

(12) 
(10) Patent No.: US 8,223,033 B1
(45) Date of Patent: *Jul. 17, 2012

(54) VEHICLE COMMUNICATION SYSTEM AND METHOD OF USE

(75) Inventor: Greg Paterno, Scottsdale, AZ (US)

(73) Assignee: Rising Phoenix Industries Incorporated, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/149,424

(22) Filed: May 31, 2011

Related U.S. Application Data

(63) Continuation of application No. 12/023,982, filed on Jan. 31, 2008, now Pat. No. 7,952,489.

(51) Int. Cl.
*G08B 5/00* (2006.01)

(52) U.S. Cl. .............. 340/815.4; 340/995.1; 340/426.13

(58) Field of Classification Search ............... 340/815.4, 340/995.1, 426.32, 468, 815.45, 815.49, 340/990, 989, 994, 426.13, 475, 479
See application file for complete search history.

(56) References Cited

U.S. PATENT DOCUMENTS

| | | | |
|---|---|---|---|
| 3,699,533 A | 10/1972 | Hunter | |
| 5,426,414 A | 6/1995 | Flatin et al. | |
| 5,602,535 A | 2/1997 | Boyles et al. | |
| 5,963,149 A | 10/1999 | Nagura et al. | |
| 6,300,870 B1 | 10/2001 | Nelson | |
| 6,690,293 B2 | 2/2004 | Amita | |
| 6,895,331 B2 | 5/2005 | Yoshida | |
| 6,979,038 B1 | 12/2005 | Cho et al. | |
| 7,397,355 B2 | 7/2008 | Tracy | |
| 7,952,489 B1 * | 5/2011 | Paterno | 340/815.4 |
| 2002/0112026 A1 * | 8/2002 | Fridman et al. | 709/217 |
| 2004/0254834 A1 * | 12/2004 | Wohlers et al. | 705/14 |
| 2007/0118423 A1 * | 5/2007 | Always | 705/14 |

* cited by examiner

*Primary Examiner* — Daniel Previl

(74) *Attorney, Agent, or Firm* — Greenberg Traurig

(57) ABSTRACT

Described is a vehicle communication system. The system includes a display installed in, or on, a first vehicle such that the display is viewable by persons in other vehicles or pedestrians proximate the first vehicle. The display is communicatively linked to one or more vehicle systems or a vehicle controller area network whereby based on activation, engagement or utilization of a vehicle system, the display automatically displays a message associated with the activation, engagement or activation of the vehicle system. For example, if a driver of the vehicle applies the brakes, a "STOPPING" message is displayed. Messages may be pre-programmed into the system or custom created and entered by a user. The display may also be used to advertise, alert passersby to an emergency or otherwise communicate with persons in other vehicles or pedestrians.

11 Claims, 7 Drawing Sheets

VEHICLE COMMUNICATION SYSTEM AND METHOD OF USE

CROSS-REFERENCE TO RELATED APPLICATIONS

This application is a continuation of U.S. patent application Ser. No. 12/023,982 filed on Jan. 31, 2008 now U.S. Pat. No. 7,952,489.

FIELD OF THE INVENTION

The embodiments of the present invention relate to a communication system for communicating from a vehicle, namely a car, truck, van or similar transport means.

BACKGROUND

Means for persons in one vehicle to communicate with persons in another vehicle or proximate thereto can be important for various reasons but such means are limited. Important reasons for such communications include advertising, emergency alerts and vehicle recovery. Currently such means for communications from a vehicle include hand gestures by a person in the vehicle, static signage or other limited means.

It would be advantageous to develop an efficient, dynamic means of communicating from a vehicle to persons proximate thereto.

SUMMARY

Accordingly, a first embodiment of the present invention is a vehicle communication system comprising: a housing; attachment means operable to attach said housing to a vehicle; display means supported by said housing; a controller in communication with said display means; a processor in communication with said controller and/or said display means; memory means pre-programmed with one or more messages for displaying on said display means; program means for programming custom messages, in addition to said pre-programmed messages, into said memory means; and remote control means operable to remotely instruct said display means.

A method embodiment of the present invention comprises: positioning a display in said first vehicle such that said display is viewable by other vehicles proximate said first vehicle; communicatively linking said display to at least one vehicle system; and programming said display to respond to said vehicle system being activated, engaged or utilized, wherein said display is programmed to show a message related to the activation, engagement or utilization of the vehicle system.

In one embodiment, messages on said display may be dynamic such that they scroll horizontally or vertically. In other embodiments, the messages may be static. Depending on the embodiment, the vehicle communication may be installed within a vehicle interior or exterior thereto.

As set forth in greater detail below, the vehicle communication system can be used to advertise, communicate distress, deter car thieves and alert other drivers of a drivers intent to stop or make other vehicle maneuvers. Pre-programmed or factory messages may include safety messages designed for specific problem situations (e.g., vehicle breakdown) while users are able to enter custom messages. Such custom messages may be limited by a number of words and/or messages.

In another embodiment, the vehicle communication system communicates with one or more vehicle systems, such as the brake system, such that the vehicle communication system may be used to communicate the intentions of the subject vehicle to vehicles or pedestrians proximate thereto.

Other variations, embodiments and features of the present invention will become evident from the following detailed description, drawings and claims.

DETAILED DESCRIPTION

Figure 1:
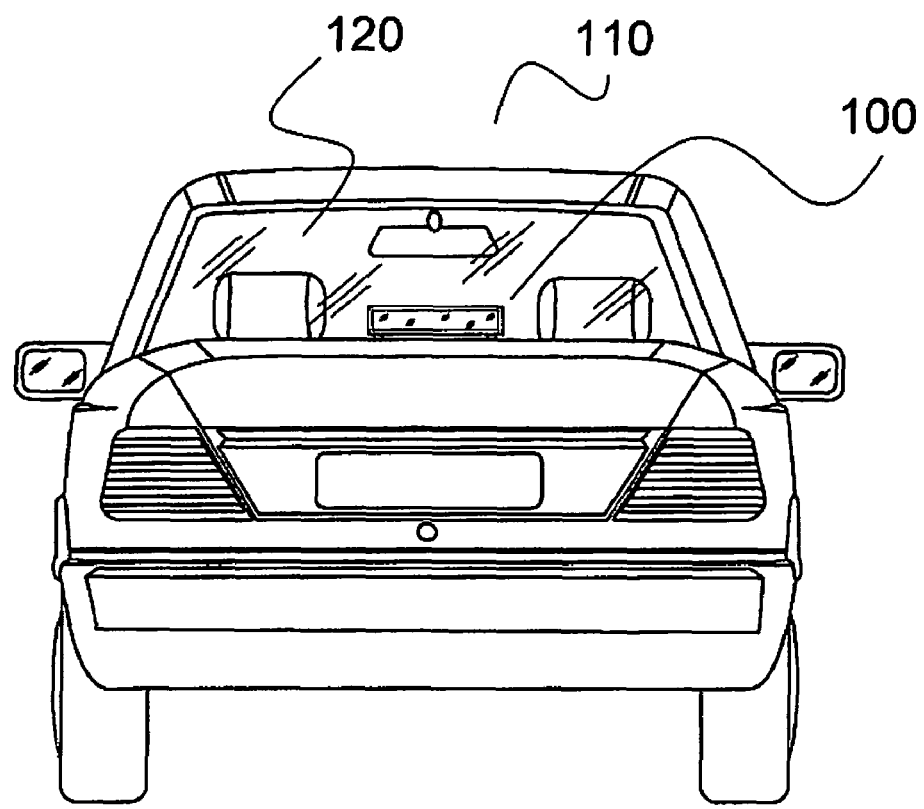
FIG. 1 illustrates a rear view of a vehicle with a vehicle communication system installed within a vehicle.

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

Figure 2:
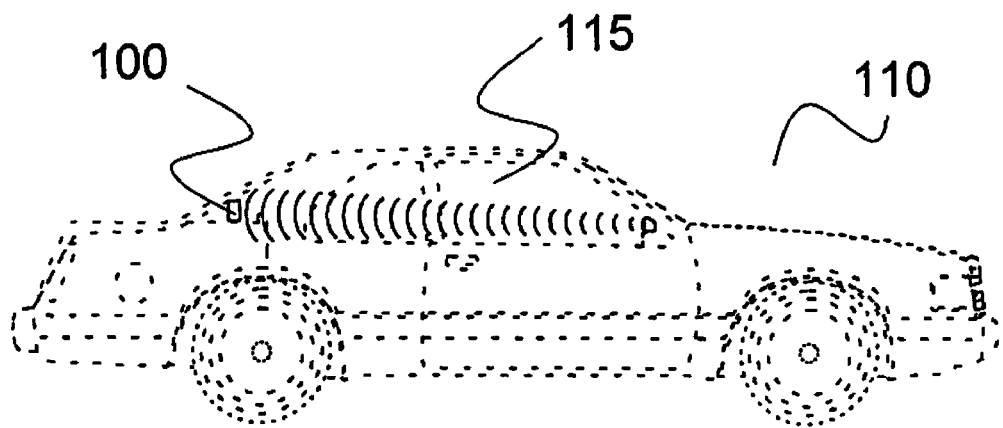
FIG. 2 illustrates a side view of a vehicle with a signal being transmitted to the vehicle communication system.
Figure 3:
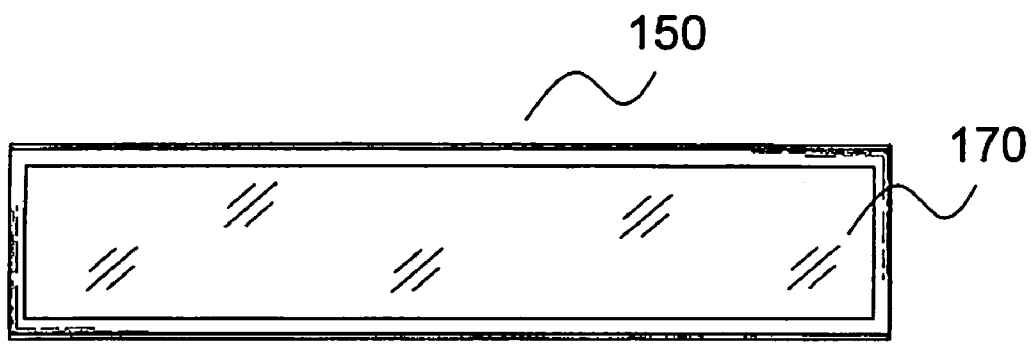
FIG. 3 illustrates a front view of the vehicle communication system.
Figure 4:
FIG. 4 illustrates a front view of the vehicle communication system with a message being displayed.
Figure 5:
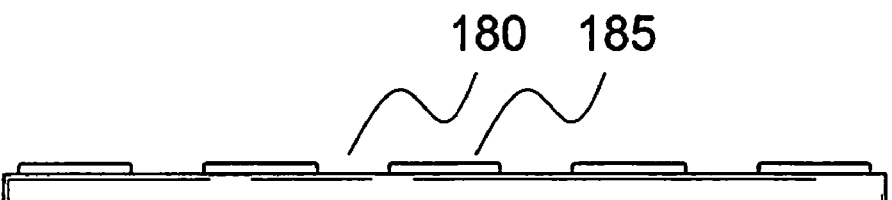
FIG. 5 illustrates a top view of the vehicle communication system.
Figure 6:
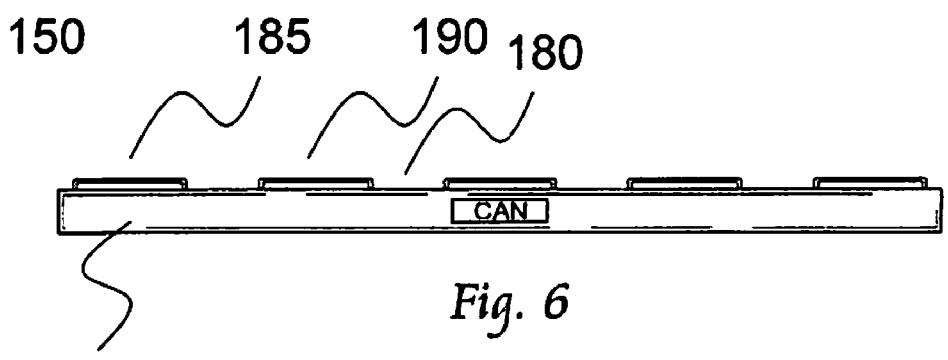
FIG. 6 illustrates a bottom view of the vehicle communication system.
Figure 16:
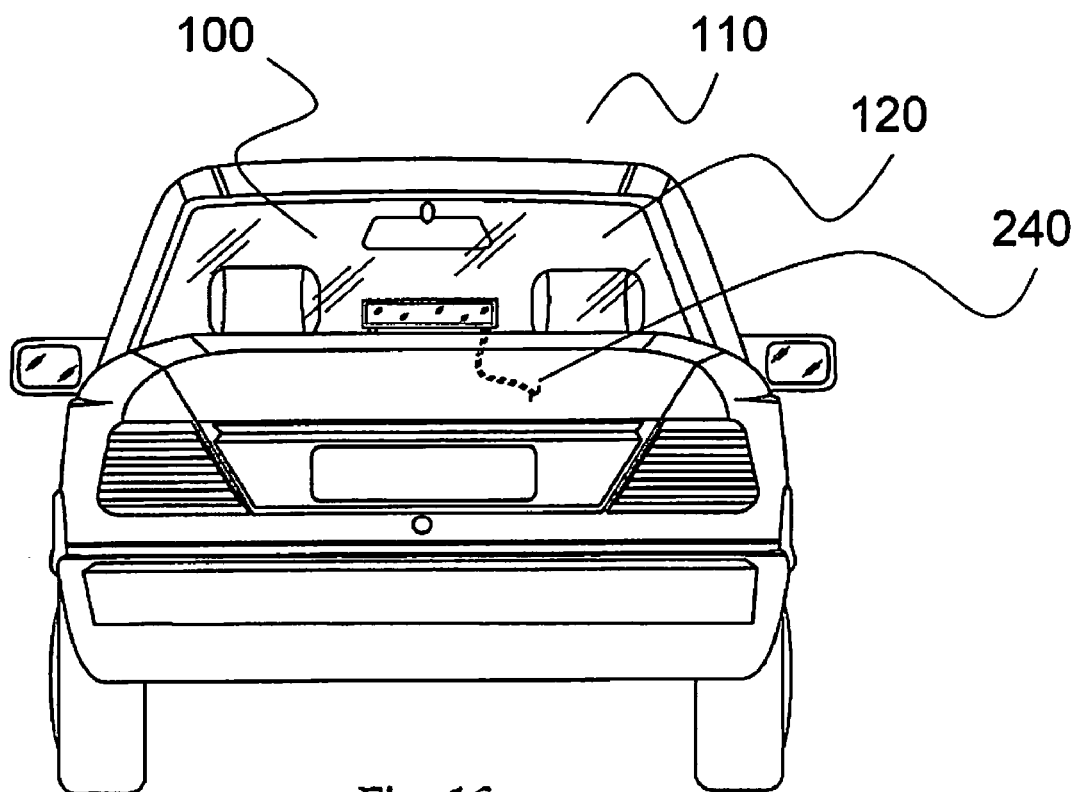
FIG. 16 illustrates the vehicle communication system installed near a rear window of the vehicle and connected to a vehicle controller area network.

Initial reference is made to FIGS. 1 and 2 illustrating a vehicle communication system generally denoted by reference numeral 100. As shown, the vehicle communication system 100 is installed in a vehicle 110 near a rear window 120. The vehicle communication system 100 is installed on a surface adjacent a rear window 120 of the vehicle 110. FIG. 16 illustrates the vehicle communication system 100 installed near a rear window of the vehicle 110 and connected to a vehicle controller area network. The vehicle communication system 100 may be installed anywhere within, or on, the vehicle 110. FIGS. 3-12 show various mechanical components of the vehicle communication system 100 comprising at least a housing 150, display 160 and display cover 170.

Figure 7:
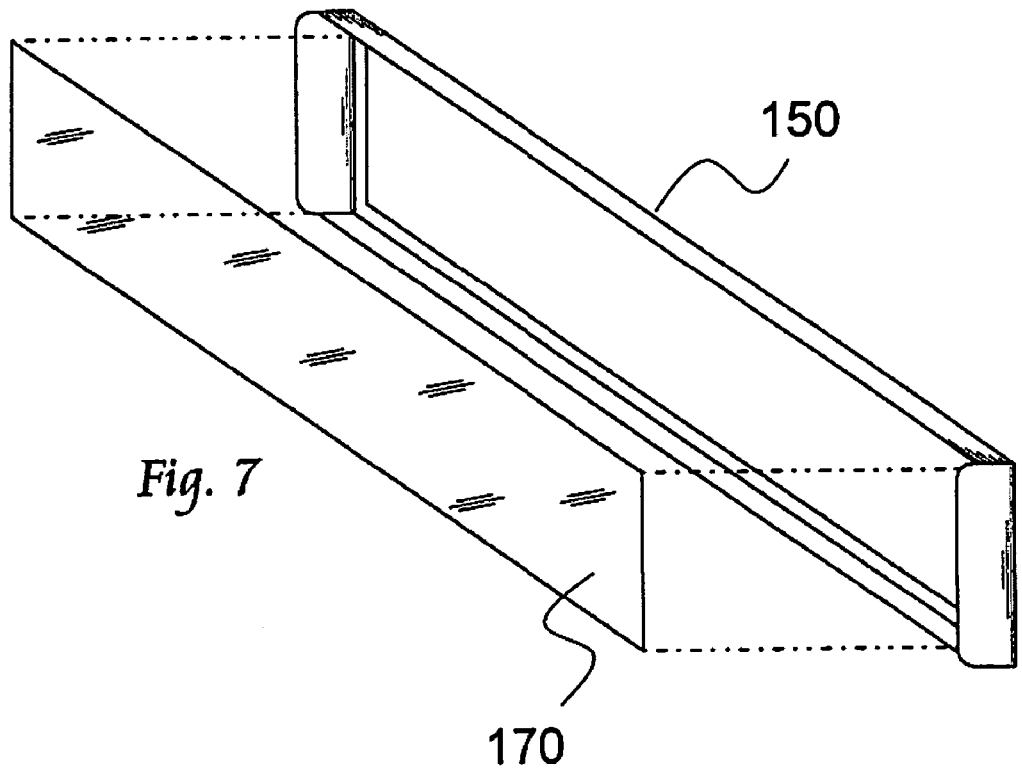
FIG. 7 illustrates an exploded perspective view of a housing and display cover.
Figure 8:
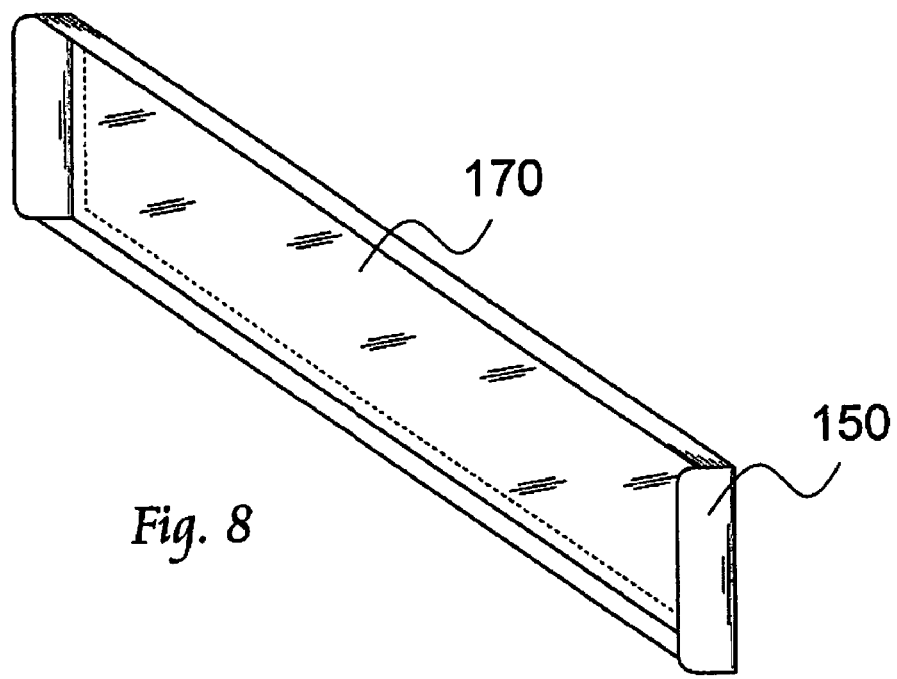
FIG. 8 illustrates a perspective view of the housing and a display cover assembled.

FIG. 7 shows an exploded view of the housing 150 and display cover 170. FIG. 8 shows the housing 150 and display cover 170 in assembled arrangement. The display cover 170 may be attached to the housing 150 using adhesives, fasteners (e.g., screws, rivets, etc.) or similar means. Alternatively, the housing 150 and display cover 170 may be fabricated of appropriate tolerances so that they snap-fit together. In one embodiment, the display cover 170 is transparent and dimensioned to protect the display 160 upon full assembly of the vehicle communication system 100. The display cover 170 may also have hue to enhance messages depicted on said display 160. The display cover 170 may be fabricated of plexi-glass, glass, plastic or similar material while the housing 150 may be fabricated of plastic, aluminum, fiberglass or the like.

Figure 9:
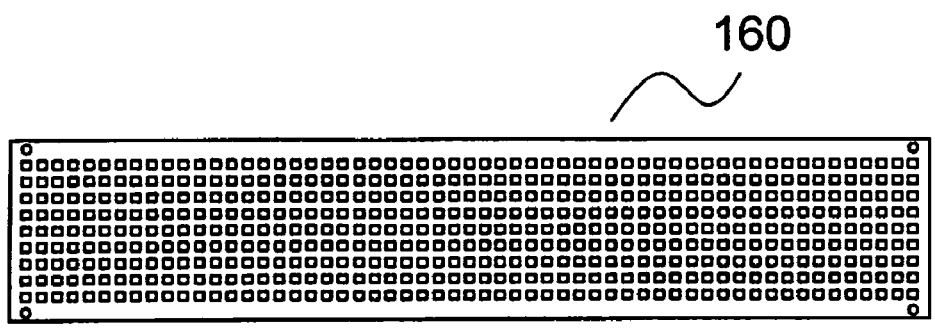
FIG. 9 illustrates a light emitting diode array forming a display.
Figure 10:
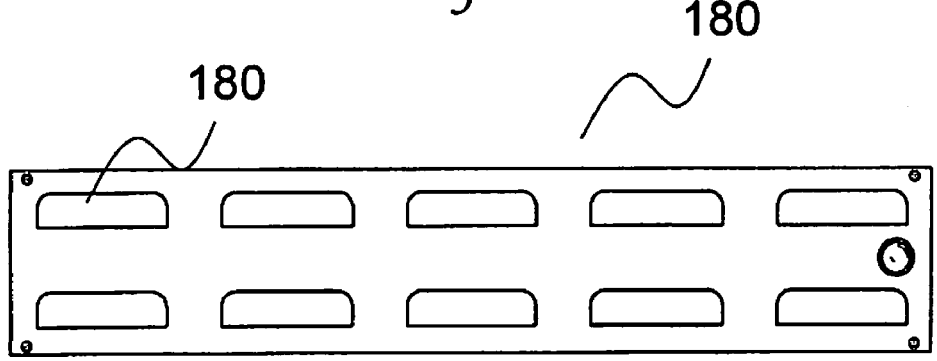
FIG. 10 illustrates a louver panel operable to cool the vehicle communication system.
Figure 11:
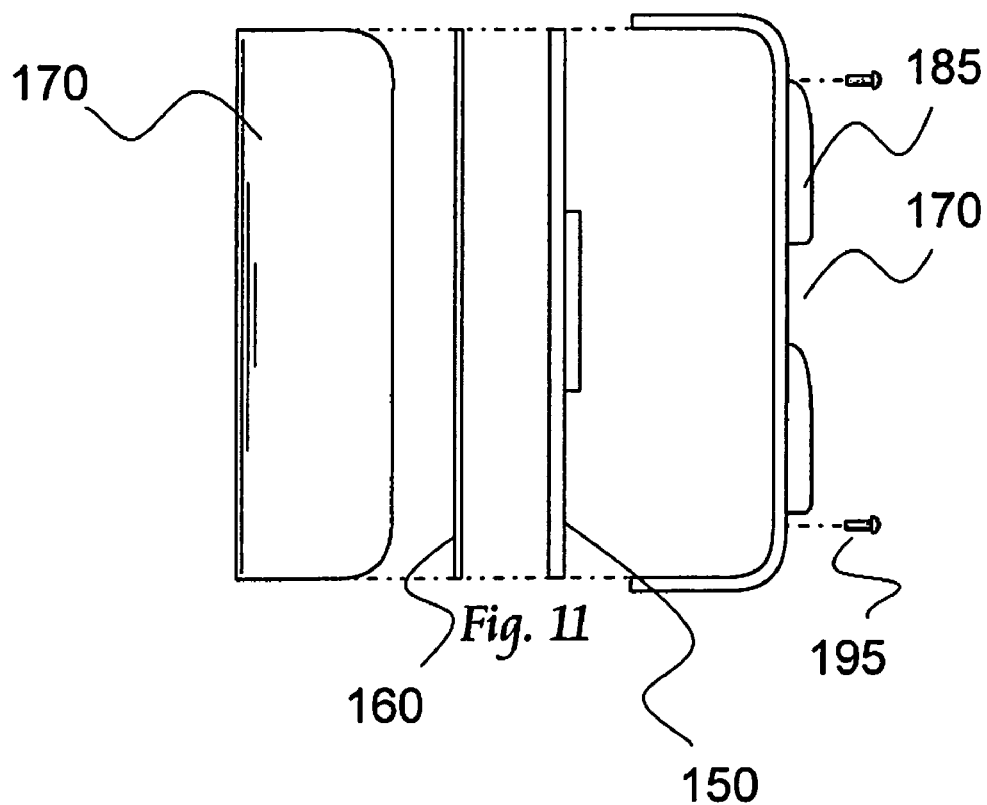
FIG. 11 illustrates an upper exploded view of the vehicle communication system.
Figure 12:
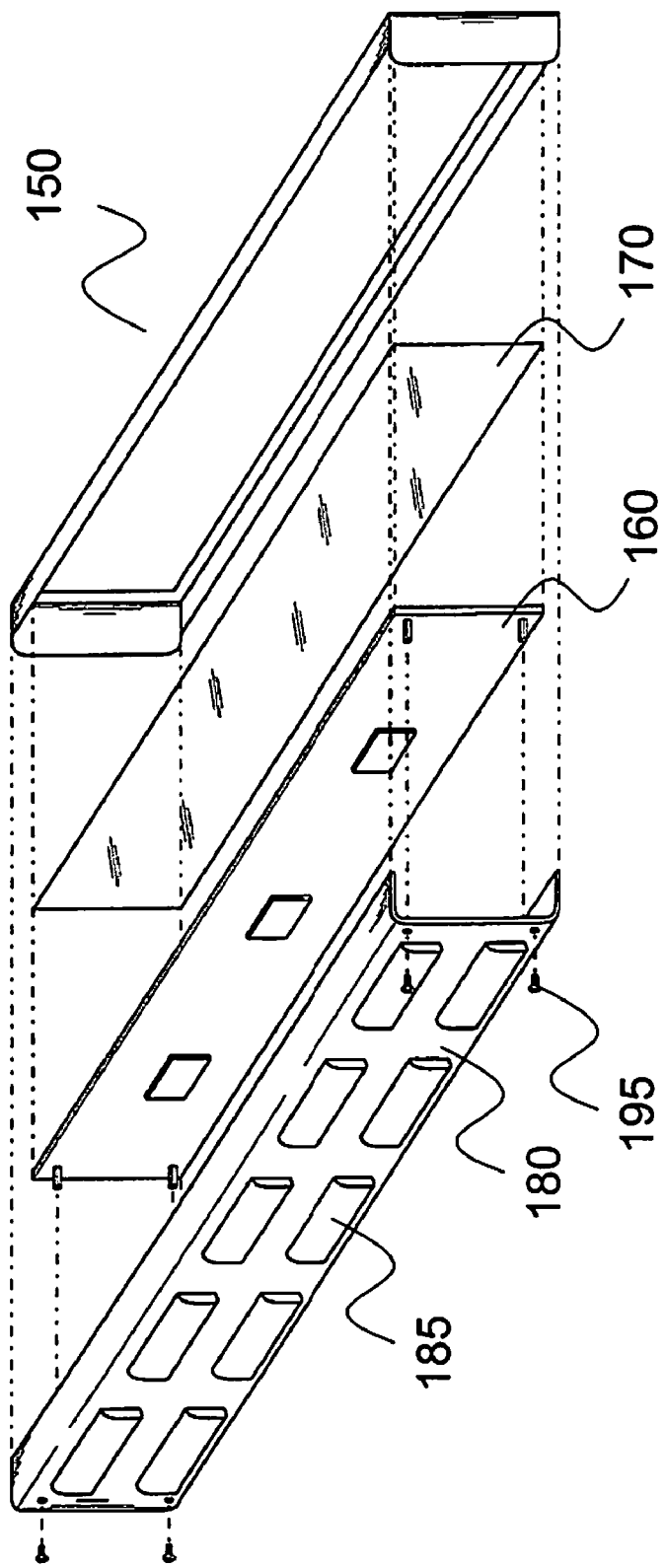
FIG. 12 illustrates a perspective exploded view of the vehicle communication system.

FIG. 9 shows the display 160 in the form of a light emitting diode panel 165. The panel 165 may generate scrolling, static and/or flashing messages. Those skilled in the art will recognize that any display type may be utilized with the embodiments of the present invention. For example, the display 160 may be a plasma or LCD video display. The LEDs 161 forming the display 160 may be white or colored (e.g., red). The display 160 may be powered by conventional batteries, a vehicle power source and/or solar power. A controller board (not shown), including memory (not shown) and an infrared receiver (not shown), are configured to communicate with the display 160. In one embodiment, the memory and receiver are integrated with the controller board. In another embodiment, the memory and receiver are separate devices operatively linked to the controller board. The receiver provides a means for a remote control device (not shown) to operate, instruct and/or program the display 160 remotely. Ideally, the remote control device communicates wirelessly with said controller and/or display 160, but it can also be a wired connection. The display 160 may also incorporate a transceiver for receiving and sending signals to the remote control device or the vehicle's controller area network (CAN) for reasons described below.

In one embodiment of the present invention, the remote control device includes a display which allows messages being shown on display 160 to be shown on the remote control device. The remote control device display mimics the display 160 such that, in one example, a message scrolling across display 160 also scrolls, in substantially real time, across the remote control device display. A transceiver allows the controller and/or display 160 to communicate with the remote control device. Alternatively, the remote control device has no display but rather a series of LEDs to indicate status, proper operation or problems with the display 160. In one embodiment, when desired by the user, the remote control device also acts a vehicle security device. In such an embodiment, the user programs a code into the remote control device using a keypad or touch screen. Failure of the user to input the code prior to starting the vehicle, or some pre-established minimum time after the vehicle is started, causes the display 160 to show "THIS VEHICLE STOLEN—PLEASE CALL POLICE" and an alarm to sound. The alarm may be the vehicle's security alarm or may be a dedicated alarm linked to the vehicle communication system 100. The remote control device may also prompt the user, via an alarm or vibration, to enter the code such the user does not simply forget to enter the code thereby creating an unwarranted emergency situation.

In one embodiment of the present invention, the memory associated with the vehicle communication system 100 is configured with three memory banks or arrays. Each bank being associated with a different message function. Those skilled in the art will recognize that more or less than three memory banks may be utilized. In this embodiment, a first memory bank stores, for example, fifty pre-programmed safety or other messages which cannot be altered, erased or manipulated by the user. The messages disclosed above and others below are examples of such safety or other messages. Another safety message is triggered responsive to the vehicle being parked and the driver exiting the vehicle. In such a situation, the display 160 shows "BEWARE!! THIS VEHICLE IS PROTECTED WITH A STOLEN VEHICLE RECOVERY SYSTEM." Such a message is intended to deter thieves. In reality, the vehicle may or may not have such a system, but in may instances the possibility is enough to deter a thief.

Second and third memory banks are reserved for custom messages created by the user and related parties. In one exemplary example, the second memory bank can be used for advertisements related to a first business while the third memory bank can be used for messages related to a second business. The messages are created by a user and stored in the second and third memory banks using a keypad on the remote control device. The remote control device may also include touch screen technology that allows the display to present an operational touchpad to the user. Alternatively, the vehicle communication system 100 may include a port (e.g., USB) which allows the user to create messages via a linked hardware device other than the remote control device (e.g., a PC or PDA). An internal software-driven filter prevents the use of vulgarity or any other inappropriate custom messages.

In addition to the housing 150, display 160 and display cover 170, the vehicle communication system 100 may include a rear cover 180 including cooling louvers 185. The louvers 185 provide an outlet 190, facing downward, for heat generated by the display 160 and corresponding circuitry to escape. By facing downward, dust and other debris is prevented from entering the assembled vehicle communication system 100. A fan may also be incorporated to maintain the display 160 and circuitry at or below specification temperatures. The four components, comprising the housing 150, display 160, display cover 170 and rear cover 180, are arranged as shown in FIGS. 11-14. As shown, fasteners, like screws 195, can be used to assemble the four components 150-180 of the vehicle communication system 100. Alternatively, adhesives may be used or the components may be fabricated to snap-fit to one another.

Figure 13:
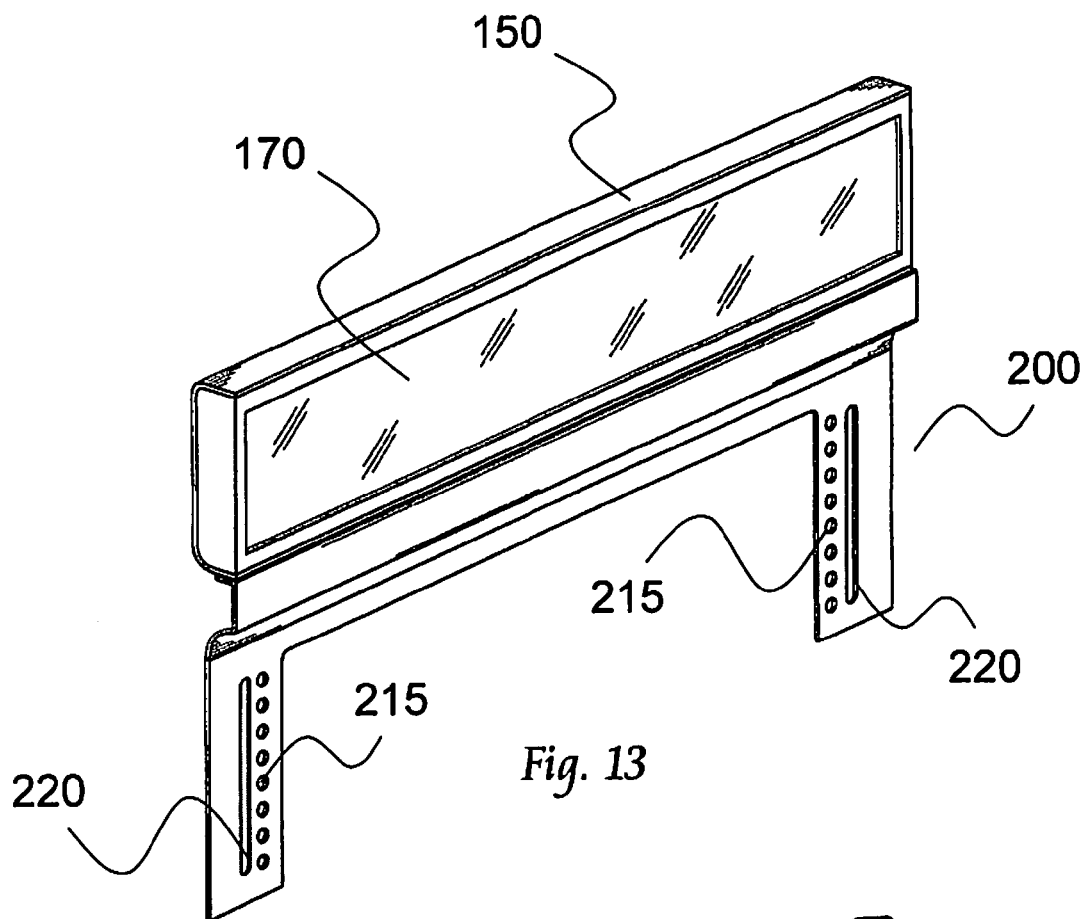
FIG. 13 illustrates a perspective view of an assembled vehicle communication system with an attachment bracket.
Figure 14:
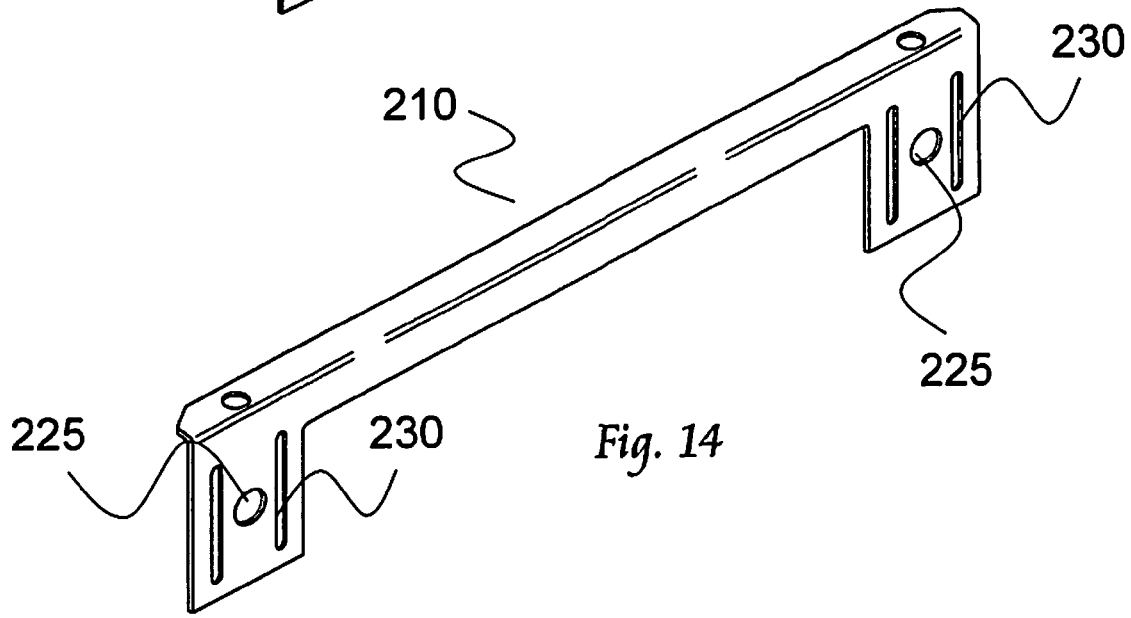
FIG. 14 illustrates an installation bracket.

In one embodiment, the assembled vehicle communication system 100 is connected to, integrated with or otherwise incorporates a bracket member 200 configured to attach to a plate member 210 (FIGS. 13 and 14). The plate member 210 connects to a subject vehicle as described in more detail below. Once the plate member 210 is attached to the vehicle, the vehicle communication system 100 is attached to the plate member 210 via bracket member 200. Holes 215 and slots 220 in the bracket member 200 correspond to the holes 225 and slots 230 in the plate member 210 such that the position of the vehicle communication system 100 may be positioned accordingly. Attaching the bracket member 200 to the plate member 210 may be facilitated by fasteners including screws, rivets or the like. Several different configurations of the bracket member 200 and plate member 210 may be fabricated to accommodate different vehicles and locations for mounting the same.

In one embodiment, as shown in FIGS. 1 and 16, the vehicle communication system 100 is attached interior to a vehicle near a rear window such that the display 160 faces rearward. The vehicle communication system 100 may also be attached on an exterior of the vehicle. For example, the vehicle communication system 100 may be attached to an exterior (e.g., trunk or bumper) of delivery vehicles and other commercial vehicles. Based on environmental conditions and the position of the vehicle communication system 100, the various components of the vehicle communication system 100 can be fabricated of heat resistant and water proof parts. Alternatively, the vehicle communication system 100 may be outfitted with a protective shell or similar mechanism to protect the system 100 from environmental conditions.

Figure 15:
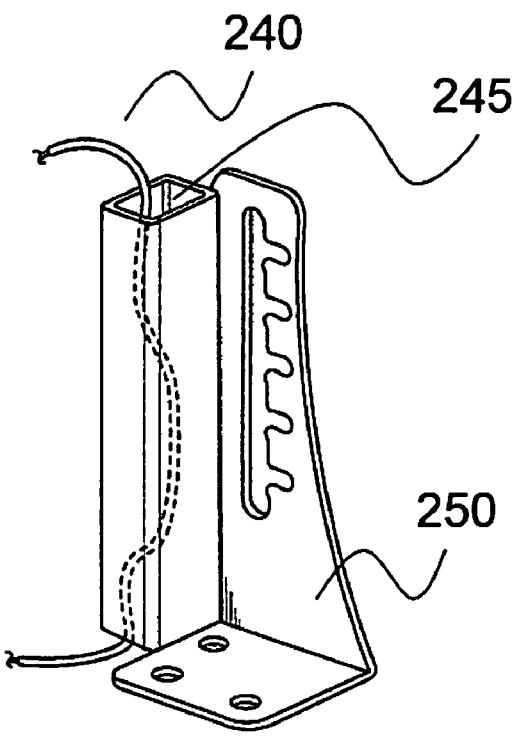
FIG. 15 illustrates a rear view of a vehicle with a vehicle communication system linked to a controller area network of the vehicle.

In one embodiment, the display 160 is linked to the vehicle's braking system to alert other drivers of the subject vehicle's intention to slow. The display 160 may also be linked to the vehicle's turn signals and reverse lights. The link between the display 160 and the braking system may be accomplished via a wired connection whereby one or more wires 240 operatively connect the display 160 to the brake lights and/or brake light wiring such that the display 160 reacts to the vehicle's brakes being engaged. Responsive to the vehicle's brakes being engaged any message being displayed is interrupted and replaced by a static message—"STOPPING" or something similar. Other messages associated with vehicle intentions may comprise "TURNING" and "BACKING UP." In such an embodiment, wires 240 from the display 160 may be concealed by passing the wires 240 through a channel 245 integrated in a bracket member 250 as shown in FIG. 15. The bracket member 250 includes three holes 255 for attaching it to the vehicle. The link between the brake system and display 160 may also be accomplished via a wireless connection triggered by application of the brake or illumination of the brake lights. In other words, as the brakes are applied, or as the brake light illuminates, a signal is transmitted to the infrared receiver in communication with the display 160 causing the "STOPPING" message to be displayed. A wireless connection 115 may also facilitate a display 160 change responsive to application of turn signals, engagement of reverse gear and other vehicle maneuvers. In one embodiment, the vehicle communication system 100 is linked to the vehicle's factory installed CAN. In such an embodiment, the vehicle communication system 100 is linked to each vehicle system via the CAN, including, but not limited to, lights, brakes, ignition, headlights, doors, etc., such that the vehicle communication system 100, and more specifically, display messages, can be pre-programmed accordingly. Ideally, such communication is wireless using a transceiver or receiver associated with the vehicle communication system 100. A wired arrangement is also conceivable.

Although the invention has been described in detail with reference to several embodiments, additional variations and modifications exist within the scope and spirit of the invention as described and defined in the following claims.

I claim:

1. A vehicle communication system comprising:
   a display;
   a controller in communication with said display;
   memory pre-programmed with one or more messages for displaying on said display;
   input means for allowing a user to program custom messages into said memory; and
   wherein said controller: (i) interrupts and stops display of custom messages in lieu of one or more pre-programmed messages responsive to information obtained from a vehicle system and (ii) restarts display of said custom message at a conclusion of said one or more pre-programmed messages.

2. The vehicle communication system of claim 1, wherein said system is configured such that said controller communicates with a vehicle's controller area network.

3. The vehicle communication system of claim 2, wherein said display is configured to automatically display messages based on information obtained from said controller area network.

4. The vehicle communication system of claim 1, wherein said vehicle system is selected from the group consisting of a vehicle's brake system, turn signal system or gear system.

5. The vehicle communication system of claim 4, wherein said display is configured to automatically display messages based on information obtained from said vehicle's brake system, turn signal system or gear system.

6. The vehicle communication system of claim 1, wherein at least a first memory bank is dedicated to pre-programmed messages and at least a second memory bank is dedicated to custom messages.

7. A vehicle communication system comprising:
   a housing;
   a bracket system operable to attach said housing to a vehicle;
   a display system comprising a light emitting diode array, controller and memory, said controller configured to receive information from one or more vehicle systems and instruct said light emitting diode array to display a message corresponding to the information received from said one or more vehicle systems, said memory pre-programmed with one or more messages for displaying on said display system;
   input means for allowing a user to program custom messages into said memory; and
   wherein said processor interrupts and stops display of custom messages in lieu of pre-programmed messages responsive to information obtained from said one or more vehicle systems and (ii) restarts display of said custom message at a conclusion of said information from said one or more vehicle systems.

8. The vehicle communication system of claim 7, wherein said vehicle system is selected from the group consisting of a vehicle's brake system, turn signal system or gear system.

9. The vehicle communication system of claim 8, wherein said display means is configured to automatically display messages based on information obtained from said vehicle's brake system, turn signal system or gear system.

10. A method of communicating from a first vehicle to surrounding vehicles or persons comprising:
    communicatively linking a display to at least one vehicle system;
    pre-programming messages into one or more memory locations for presentation on said display responsive to said vehicle system being activated, engaged or utilized, wherein said display is pre-programmed to show a message related to the activation, engagement or utilization of the vehicle system;
    providing input means for allowing a user to program custom messages into said one or more memory locations; and
    interrupting and stopping display of custom messages in lieu of pre-programmed messages responsive to information obtained from said at least one vehicle system and (ii) restarting display of said custom message at a conclusion of said information from said at least one vehicle system.

11. The vehicle communication system of claim 10, wherein said vehicle system is selected from the group consisting of a vehicle's brake system, turn signal system or gear system.

* * * * *